G. E. STEVENS.
CONTROLLING MECHANISM FOR AUTOMOBILE STARTING MOTORS AND LIGHTING GENERATORS.
APPLICATION FILED JAN. 11, 1915.

1,170,196.

Patented Feb. 1, 1916.
2 SHEETS—SHEET 1.

Witnesses:

Inventor,
George E. Stevens,
by
Att'y.

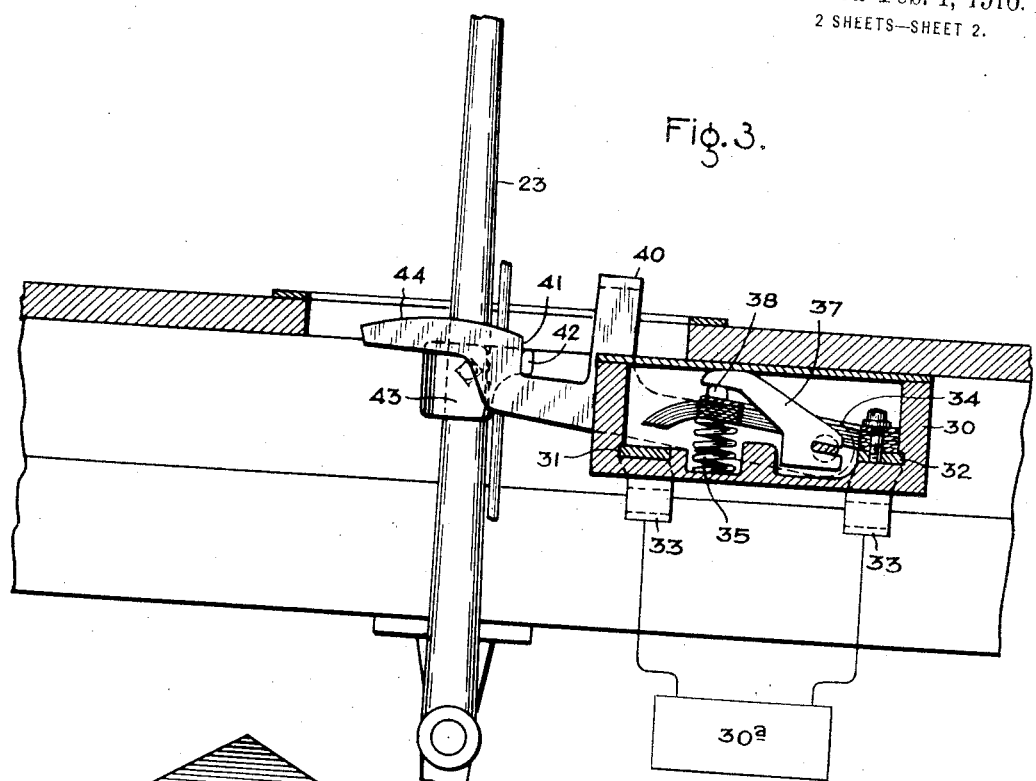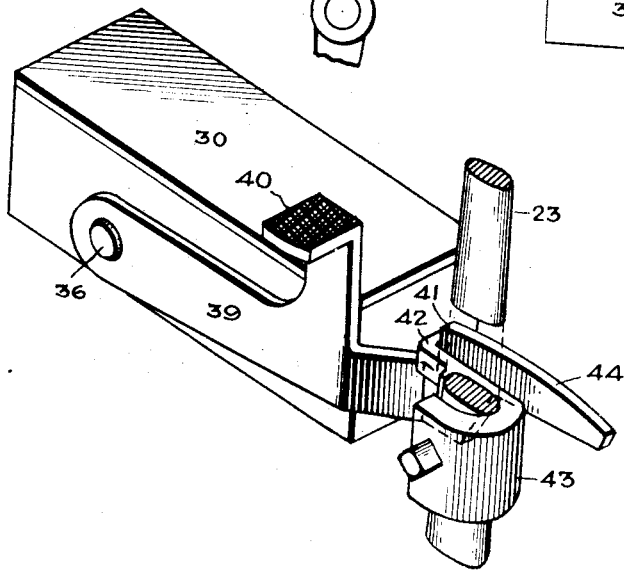

UNITED STATES PATENT OFFICE.

GEORGE E. STEVENS, OF LYNN, MASSACHUSETTS, ASSIGNOR TO GENERAL ELECTRIC COMPANY, A CORPORATION OF NEW YORK.

CONTROLLING MECHANISM FOR AUTOMOBILE STARTING-MOTORS AND LIGHTING-GENERATORS.

1,170,196.  Specification of Letters Patent.  Patented Feb. 1, 1916.

Application filed January 11, 1915. Serial No. 1,539.

*To all whom it may concern:*

Be it known that I, GEORGE E. STEVENS, a citizen of the United States, residing at Lynn, county of Essex, State of Massachusetts, have invented certain new and useful Improvements in Controlling Mechanism for Automobile Starting-Motors and Lighting-Generators, of which the following is a specification.

The present invention relates to automobiles wherein an electric motor is provided for starting the engine and is or may be driven thereafter as a generator to charge a storage battery or to directly furnish current for lighting purposes. The chief problem presented in the operation of such a system is to prevent the improper use of the electrical apparatus and to provide controlling means therefor which are so combined with or related to the normal controlling apparatus of the vehicle itself that mistakes in the manipulation of the electric controlling devices are prevented, at the same time permitting the normal controlling devices of the vehicle to be operated in their usual sequence.

For a consideration of what I believe to be novel and my invention, attention is directed to the accompanying description and the claims appended thereto.

Figure 1:
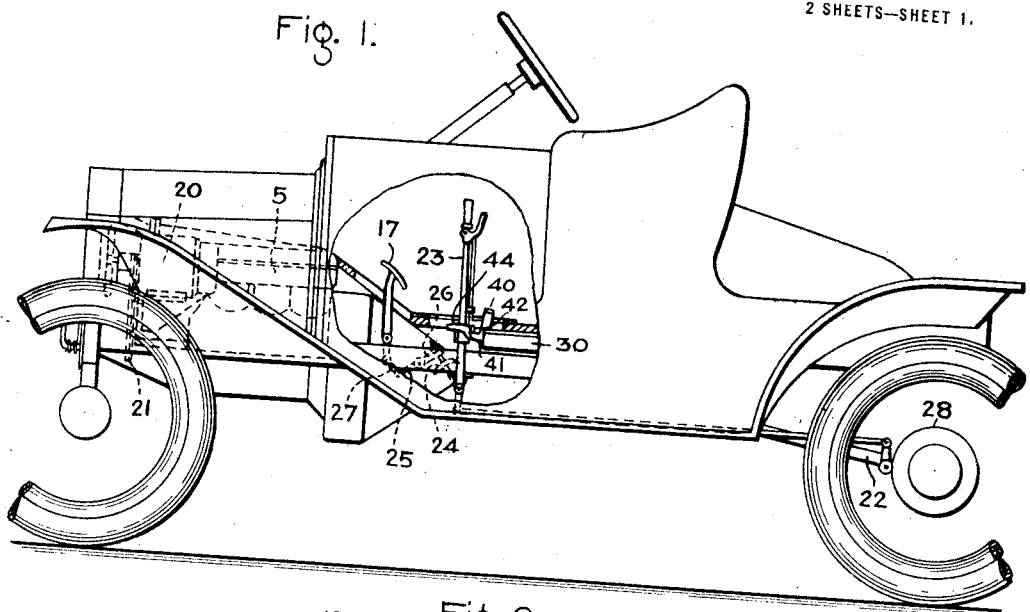
Figure 2:
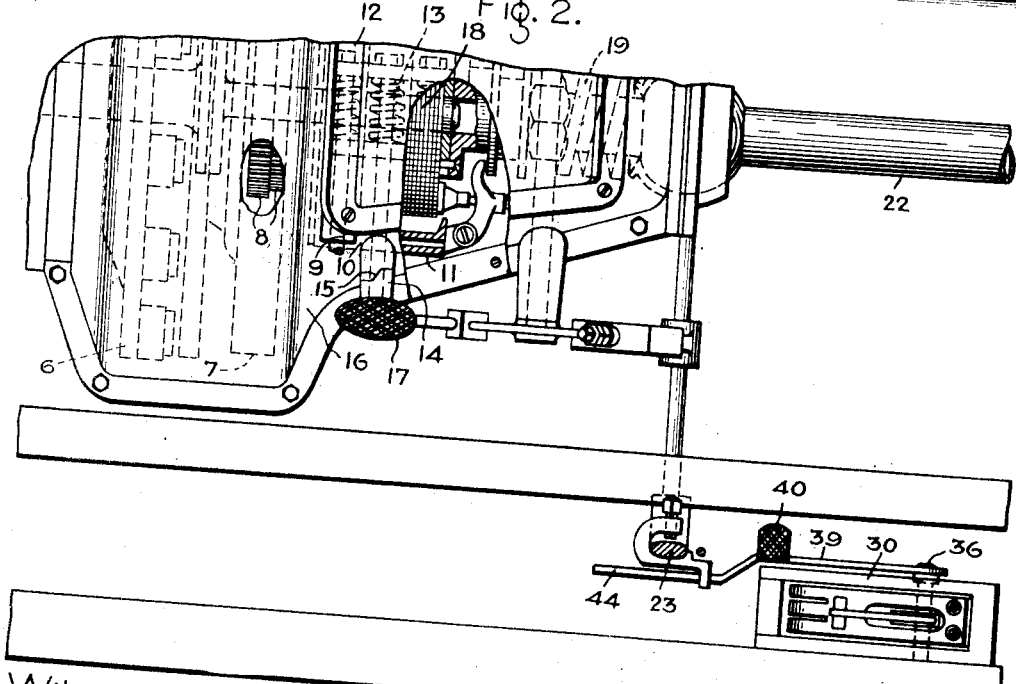

In the accompanying drawings which illustrate one of the embodiments of my invention, Figure 1 is a view in side elevation of an automobile; Fig. 2 is a vertical plan view of the same illustrating parts of the speed changing gearing, and also the circuit controlling switch of the dynamo electric machine and its actuating means; Fig. 3 is a longitudinal section through said switch and showing the interlock between it and the hand controlling lever of the automobile, and Fig. 4 is a perspective view of the switch and of the interlock between it and the hand controlling lever.

In describing my invention I shall do so in connection with the well known Ford automobile since it has great utility in connection therewith, but it is to be understood that the invention is not necessarily limited thereto.

In the drawing is shown an automobile having an internal combustion engine 5 which is controlled in the usual way by throttle and spark adjusting levers not shown, but generally mounted on the steering column.

6 indicates the rotor of the ignition magneto that is driven by the engine shaft.

7 indicates a fly-wheel which carries pinions 8 that mesh with gears carried by sleeves concentric with the engine shaft and form part of a planetary system of power transmission between the engine and the vehicle wheels. Surrounding the sleeves and connected thereto is a reversing drum 9, a low speed drum 10, and a service brake drum 11. Surrounding each drum is a band brake 12 whose up-turned ends are normally pressed apart by a coiled compression spring 13. Passing through the ends of each band is a spindle 14 having a bevel faced cam 15 fixed thereon that engages a corresponding fixed cam on the casing 16. Forward movement of the foot pedal 17 rigidly connected to the spindle causes the cams to move the spindle longitudinally and move the band into contact with its drum. Each brake band has its own pedal, but for simplicity only one is shown.

18 indicates a multiple disk clutch that comes into service for high speed operating conditions, and 19 a coiled compression spring for causing the clutch parts to engage when it is released.

Mounted on the side of the engine and shown in dotted lines is a dynamo electric machine 20 which serves as a motor for starting the engine after its circuit is closed and also as a generator to furnish current for charging the storage battery and for lighting after the engine is in operation. The rotor of the machine is connected to the engine shaft by suitable driving connection, such as a chain or gearing 21. The details of construction of said machine are immaterial to the present invention. It is sufficient to say that after the engine is started and attains a predetermined speed the machine operates as a generator to furnish current.

As has been indicated above, the Ford automobile has a planetary system of gearing forming a power transmitting means between the engine and the propeller shaft 22 leading to the differential in the rear axle. At a suitable point convenient to the driver is a hand actuated controlling lever 23 that has three principal positions.

When moved to its rear position it first opens the clutch 18 through its action on the clutch pedal 17, by means of cam 24, lever 25, screw 26 and link 27, and then applies the emergency brakes 28. This is the proper position for the lever when the vehicle is at rest. When moved slightly forward of a vertical plane to its neutral position or zone the brakes are released, and when moved to the extreme forward position it moves the cam 24 out of the path of the screw 26 carried by the lever 25 and permits the clutch to close and the vehicle to be operated at its highest speed. The foot actuated clutch pedal 17 projects up through the floor of the vehicle and also has three principal positions—forward to permit the proper engagement of the transmission parts to drive the vehicle at its lowest or starting speed; an intermediate or neutral position slightly in the rear of the first where the transmission parts are released, and the engine is permitted to run free; and a rear position where the parts of the clutch 18 are in contact and the engine is directly connected to the propeller shaft 22. It will be seen that the cam 24 and the parts 25—26 and 27 form an interlock between the hand lever 23 and the foot pedal 17 which insures the proper sequence of operation. The parts thus far described for transmitting power to the wheels and controlling the operation are old and well known.

Referring now to the controlling means for the combined starting motor and electric generator and to the interlock between it and the vehicle controlling means, 30 indicates a switch that may conveniently be attached to one of the floor beams of the body and controls the circuit between the storage battery 30a and the dynamo electric machine 20. It comprises fixed contacts 31 and 32 which are provided with extensions 33, Fig. 3, to receive the cables which convey current to and from the battery. The circuit closing member comprises a bundle of copper laminæ or other good conducting material 34 which is fastened to one of the terminals, such as 32, while its other end makes or breaks the circuit at contact 31. I find it preferable to fasten the switch member at one end and employ only a single break instead of two, since by so doing the loss in voltage through the switch is decreased by approximately one-half. The switch is biased to open position by the coiled compression spring 35. In order to close the switch a horizontal spindle 36 is provided which is supported at its ends in bearings in the switch casing and is cut away at a point between its ends to receive the switch actuating arm 37. The free end of the arm is in contact with an insulating block 38 that rests on the top of the laminated switch member. Securely fastened to the spindle 36 is a lever 39 that carries a foot pedal 40. This lever is also extended to form an interlock between the switch and the hand controlling lever 23. On the lever is a shoulder 41 which acts as a temporary stop for the finger 42 that is secured to the hand lever by an adjustable clamp 43. By this means the free movement of the lever is restricted to a predetermined zone. The outer end or extension of the switch actuating lever has a curved surface 44 which is concentric with the axis or pivot of the lever 23 so that when the switch is once closed by the foot pedal the finger can slide thereon and at the same time hold the switch closed. It will thus be seen that the finger 42 has two separate and distinct functions—the first to prevent the control lever 23 from moving to a position where the high speed gearing can come in service until the switch pedal 40 has been depressed, and the second to hold the switch closed after the interlocking zone has been passed, and the pedal 40 released. Before the second function can be performed the hand lever 23 must be moved outside of the interlocking zone and to a position where the finger is forward of the shoulder 41. The switch and the stop or shoulder 41 on its actuating lever should be so arranged that when mounted on the vehicle the hand lever 23 can move from the emergency brake applying position to the neutral zone or position where the brakes are released, but not far enough to permit the interlocking cam 24, Fig. 1, to release the foot pedal 17 and permit the high speed gearing to come into service.

The operation of my improved apparatus is as follows: Assuming that it is desired to start the vehicle from the position of rest, the ignition circuit of the engine is closed in the usual manner after which the switch pedal 40 is depressed. This closes the circuit of the motor 20 which as it turns rotates the engine shaft until the engine begins to fire, after which the pedal 40 can be released and the engine permitted to run free, or if the driver is ready to start the vehicle he continues to keep the foot pedal 40 depressed while he moves the hand lever 23 to such a position that the finger 42 carried thereby engages the curved surface 44 of the lever and holds the switch closed. He then depresses the foot pedal 17 to connect in the low speed gearing between the engine and the propeller shaft, after which the hand lever 23 is moved to its extreme forward position, the finger 42 meanwhile riding on the curved surface 44 and holding the switch closed. After the desired vehicle speed is attained the foot pedal 17 is permitted to move to its extreme rear position where the clutch directly connects the engine to the propeller shaft, the forward movement of the lever 23 having removed the interlocking cam 24 from the path of the screw 26 carried by the lever 25. As soon as the engine reaches a predetermined speed by the admission of sufficient fuel to the engine, the dynamo electric machine 20 acts as a generator and supplies current through the switch 30 to the storage battery, or to the lamps, as desired. It is to be noted that although the hand lever 23 is capable of holding the switch closed after it has been depressed by the pedal 40, it is incapable of closing it until it has been so depressed. The purpose of the arrangement is to prevent any person meddling with the car and releasing the emergency brakes from inadvertently starting the car with the high speed gearing in action and causing it to run away, the motor being powerful enough to drive the vehicle. It will be apparent from the construction shown, that each time the controlling lever 23 is moved to the rear to its neutral zone or to brake applying position, that it releases the self opening switch 30, thereby disconnecting the electric machine 20 from the source of supply. This prevents all danger due to the motor driving the vehicle forward and also eliminates the possibility of short circuiting the battery through the dynamo electric machine when the latter is being turned so slowly by the engine as not to develop a sufficient counter-electromotive force to prevent an abnormal flow of current.

My improved apparatus has the further and very material advantage that no modification of the existing parts of the automobile are required. The only addition to the controlling mechanism proper of the vehicle is the clamp 43 on the controlling lever 23 and this can be applied without removing the lever from its place. By arranging the parts in the manner described the chance of the driver doing the wrong thing, or forgetting to do the proper thing as regards the electrical apparatus is reduced to a minimum. The driver operates the car in the usual manner, except that the hand lever 23 can not be thrown forward until the switch 30 is closed, after which the controlling mechanism of the electrical apparatus is fully taken care of.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A vehicle having an internal combustion engine for driving it, power transmitting means between the engine and the vehicle wheels, and a controlling device for said means, in combination with a dynamo electric machine whose rotor is connected to the engine shaft to drive it or be driven thereby, a switch controlling the circuit of said machine, an actuator for the switch, and an interlocking means between the controlling device and the actuator which prevents certain movements of the device until the actuator has been moved to a predetermined position.

2. A vehicle having an internal combustion engine for driving it, power transmitting means between the engine and the vehicle wheels, and a controlling device for said means, in combination with a dynamo electric machine whose rotor is connected to the engine shaft to drive it or be driven thereby, a switch controlling the circuit of said machine, an actuator for the switch, and an interlocking means between the controlling device and the actuator which prevents the controlling device from connecting the engine to the driving wheels through the power transmitting means until the actuator has first moved said switch.

3. A vehicle having an internal combustion engine for driving it, power transmitting means between the engine and the vehicle wheels, and a controlling device for said means, in combination with a dynamo electric machine whose rotor is connected to the engine shaft to drive it or be driven thereby, a switch that controls the main circuit between said machine and its source of current supply, an actuator for the switch, and a stop moving with the switch that is normally interposed in the path of the controlling device and limits its movement to a restricted zone until said switch is closed.

4. A vehicle having an internal combustion engine for driving it, power transmitting means between the engine and the vehicle wheels, and a lever which controls the power transmitting means, in combination with a dynamo electric machine whose rotor is connected to the engine shaft to drive it or be driven thereby, a switch for controlling the circuit of said machine which is held closed by the lever so long as it is in its high speed position, a stop that prevents the lever from moving out of a restricted zone until the machine starts into operation as a motor, and means for closing the switch and moving the stop out of the path of the lever.

5. A vehicle having an internal combustion engine for driving it, power transmitting means between the engine and the vehicle wheels, and a lever which controls the power transmitting means, in combination with a dynamo electric machine whose rotor is connected to the engine shaft to drive it or be driven thereby, a switch in the main circuit of the machine that is biased to open position and is held closed by the lever when it is in one of its positions, an actuator for closing the switch independently of the lever, and a means for preventing the lever from acting on the switch until it has first been closed by the actuator.

6. A vehicle having an internal combustion engine for driving it, power transmitting means between the engine and the vehicle wheels, and a lever which controls the power transmitting means, in combination with a dynamo electric machine whose rotor is connected to the engine shaft to drive it or be driven thereby, a switch in the main circuit of the machine that is biased to open position and is held closed by the lever when it is in one of its positions, an actuator for the switch comprising a lever which carries a stop normally located in the path of the lever, and a pedal for moving the switch lever in a direction to remove the stop from the path of the control lever.

7. A vehicle having an internal combustion engine for driving it, power transmitting means between the engine and the vehicle wheels, and a controlling lever for said means, in combination with a dynamo electric machine whose rotor is connected to the engine shaft to drive it or be driven thereby, a switch controlling the circuit of said machine, an actuator for the switch, a finger carried by the lever, and a stop carried by the actuator that normally stands in the path of movement of the finger and is removed therefrom whenever the switch is closed.

8. A vehicle having an internal combustion engine for driving it, power transmitting means between the engine and the vehicle wheels, and a controlling device for said means, in combination with a dynamo electric machine whose rotor is connected to the engine shaft to drive it or be driven thereby, a switch controlling the circuit of said machine, an actuator for the switch, and an interlock between the controlling device, and the actuator, one part of which is carried by the said device and the other by the actuator, the part carried by the device serving to hold the switch closed after the interlocking zone has been passed.

9. A vehicle having an internal combustion engine for driving it, power transmitting means between the engine and the vehicle wheels, and a controlling lever for said means, in combination with a dynamo electric machine whose rotor is connected to the engine shaft to drive it or be driven thereby, a switch controlling the circuit of said machine, an actuator for the switch that has an extension which is substantially concentric with the axis of the lever when the switch is closed and also a stop, and a finger carried by the lever which moves in the path of the stop when the switch is open and which engages said extension and holds the switch closed after the stop has been moved to permit of free movement of the lever.

In witness whereof, I have hereunto set my hand this 8th day of January, 1915.

GEORGE E. STEVENS.

Witnesses:
JOHN A. MCMANUS, Jr
JOHN T. BEECHLYN.

Copies of this patent may be obtained for five cents each, by addressing the "Commissioner of Patents, Washington, D. C."